(12) United States Patent  
Baudat (10) Patent No.: US 9,473,690 B1
(45) Date of Patent: Oct. 18, 2016

(54) CLOSED-LOOP SYSTEM FOR AUTO-FOCUSING IN PHOTOGRAPHY AND A METHOD OF USE THEREOF

(71) Applicant: Gaston Daniel Baudat, Elkins Park, PA (US)

(72) Inventor: Gaston Daniel Baudat, Elkins Park, PA (US)

( * ) Notice: Subject to any disclaimer, the term of this patent is extended or adjusted under 35 U.S.C. 154(b) by 139 days.

(21) Appl. No.: 14/470,935

(22) Filed: Aug. 27, 2014

Related U.S. Application Data (60) Provisional application No. 61/870,694, filed on Aug. 27, 2013.

(51) Int. Cl.
*H04N 5/232* (2006.01)
*G02B 7/28* (2006.01)
*G02B 23/24* (2006.01)
*G03B 13/36* (2006.01)

(52) U.S. Cl.
CPC .......... *H04N 5/23212* (2013.01); *G02B 7/287* (2013.01); *G02B 23/2484* (2013.01); *G03B 13/36* (2013.01)

(58) Field of Classification Search
CPC .......... H04N 5/23212; H04N 5/2258; G03B 17/48; G03B 13/36; G03B 23/12; G03B 23/2484; G03B 7/28; G03B 7/287
See application file for complete search history.

(56) References Cited

U.S. PATENT DOCUMENTS

| | | | | |
|---|---|---|---|---|
| 2002/0186304 A1* | 12/2002 | Kono | ................... | G01S 7/4812 348/216.1 |
| 2004/0150899 A1* | 8/2004 | Barziza | ................... | G03B 17/48 359/822 |
| 2014/0267640 A1* | 9/2014 | Barziza | ................... | H04N 5/2252 348/61 |

OTHER PUBLICATIONS

Innovations Foresight, LLC On-Axis Guider (ONAG) User Manual Rev. 3.0—2011.*

* cited by examiner

*Primary Examiner* — Daniel M Pasiewicz
(74) *Attorney, Agent, or Firm* — Steinberg Intellectual Property Law LLC; Gloria M. Steinberg, Esq.

(57) ABSTRACT

A closed-loop system for auto-focusing in photography is used to capture better images of remote objects by generating and executing auto-focusing corrections in real time. The system includes an image collecting device, a focuser, a beam selector, an imaging camera, a second camera, and a computing unit. The image capturing device is typically a telescope that is used to capture the image of the remote object. The beam selector is used to split the captured image between the imager camera and the second camera. The imager camera is used to progressively create the image of a target. The second camera is used to create images of a reference object at regular intervals. The images of the reference object are analyzed by the computing unit and are used to generate auto-focusing corrections by the computing unit. Those corrections are then executed by the focuser.

14 Claims, 6 Drawing Sheets

CLOSED-LOOP SYSTEM FOR AUTO-FOCUSING IN PHOTOGRAPHY AND A METHOD OF USE THEREOF

The current application claims a priority to the U.S. Provisional Patent application Ser. No. 61/870,694 filed on Aug. 27, 2013.

FIELD OF THE INVENTION

The present invention generally relates to auto-focusing in astrophotography. More specifically, the present invention is a method to control in real time the focus of a camera while imaging with a telescope.

BACKGROUND OF THE INVENTION

Imaging with a telescope requires often long exposures, especially for deep space objects. Today's digital technology allows for taking multiple frames of a target with exposure times ranging from a few minutes to half an hour. These frames are then digitally aligned, stacked and processed to make the final image. The resulting total exposure time could amount to several hours, or more. Sometimes it takes several nights which can stretch over a period of weeks to collect enough frames to create the final image.

During the course of taking such frames, it is paramount that the camera sensor plane remains at the telescope focal plane (best focus). Any change, even tiny, in the focus may lead to significant degradation of the frame quality, due to blur (circle of confusion) and other optical distortions associated with out-of-focus situations (coma, astigmatism, field curvature, chromatic aberrations, etc.). For instance under good viewing conditions, a star profile, typically described by its Full Width at Half Maximum (FWHM) could be as low as 1 arc-second ("). Diffraction limited telescopes will easily resolve this. However the imager camera must be precisely set at best focus to achieve this resolution. Let's assume a 2 meters (m) focal length scope at F/6.

1" translates on: $\tan(1/3600*pi/180)*2=9.7$ um (microns)

Moving the focus plane (for an F/6 scope) by 6*9.7 um=58.2 um will double the star profile due to the out-of-focus blur. In order to keep this effect to a minimum, we should limit such defocus values to around +/−6 um which corresponds to roughly $1/10^{th}$ of the star profile. This is usually the value above which a human inspection would detect the change in star size. During the time one takes frames over the night (or many nights) the focus will likely move by much more than this due to load transfer (the scope mount tracks the target at sidereal rate, or 15 degrees per hour) and flexure, as well as temperature changes (scope tube and mechanic will shrink when the temperature drops overnight. Optical surfaces may experience slight changes in curvature due to temperature gradient in the material). Those are the most common sources of error, among other possible sources, leading to focal plan motions and/or camera position motions. Usually the scope optical train is equipped with a focuser mechanism. The focuser device is in charge of correcting any change in focal plane and/or imager camera position. A focuser will mechanically move the camera or other attached equipment either further or closer to the scope visual back to bring the imager sensor plane back to best focus. Sometime focus correction is achieved by moving one or many optical elements of the scope, such as the primary or secondary mirror. This is typically the case for a Smidt Cassegrain telescope (SCT). Also, a common situation is a mix of both methods, with a coarse focus adjustment by moving optical parts (mirror(s) and/or lenses(s)), and a fine focus adjustment by mechanically moving the camera and its equipment (Crayford style or other type of focuser). Sometimes, only a scope optical element motion is used.

This type of focuser uses two parallel plates to mount the telescope on one side and the camera on the other. The plates are connected together with threaded shafts. The shafts rotate in order to increase or decrease the distance between the parallel plates. It is understood that this is just an example of how a different type of focuser can be used to achieve the same goal.

Today's state of the art re-focusing methods use a reference star at regular intervals (half an hour for instance). Most of the time this requires that the user move the telescope to a bright enough reference star, unless one is available in the imager frame's field of view (FOV) and outside the current target FOV, or at least off axis. Then the user must move the focuser "in" and "out" in relation to the best focus plane while taking pictures of the reference star. Hereinafter, the term "in" refers to the telescope focal plane being moved forward with respect to the imager sensor plane, and the term "out" refers to moving the telescope focal plane backward with respect to the imager sensor plane. This can be achieved by moving the imager camera with a focuser, or moving the telescope focal plane itself, or both. Finally the user must compare the star FWHM (or other related figures of merit) to evaluate the focus quality. This is done iteratively ("in" and "out") until the best focus is achieved (smallest FWHM for instance). This is because there is usually no information that indicates which direction the focuser should be moved to reach best focus (the out-of-focuser blur shape is usually quite identical before or after best focus, therefore there is no information of direction available). Since the star images do not indicate which direction the correction should take place ("in" or "out" versus best focus position), iterative "in" and "out" focus steps must be used to solve this problem. During the time it takes to move the scope to the reference star and refocus, it is not possible to image the target anymore. The target reacquisition could also take a significant amount of time and be a source of error. This invention solves those problems by refocusing during the main target imaging session by using at least one reference star in, or near target FOV, which is usually already used for auto-guiding purpose.

DETAILED DESCRIPTION OF THE INVENTION

All illustrations of the drawings are for the purpose of describing selected versions of the present invention and are not intended to limit the scope of the present invention.

The present invention is a closed-loop system for auto-focusing in photography and a method of implementing that closed-loop system in order to focus the image being produced by the present invention in real time. The system components of the present invention includes an image collecting device, a focuser, an imager camera, a second camera, an optical aberration device, and a computing unit. The image collection device is an instrument used to capture the electromagnetic (EM) radiation being emitted from a remote object. In the preferred embodiment of present invention, the image collection device is a telescope. The beam selector allows the EM radiation being captured by the image collection device to be split between the imager camera and the second camera. The imager camera is used to create the image of a target being captured by the image collection device. The second camera is also used to create the image of a reference object being captured by the image collection device so that auto-focusing corrections can be generated and executed by the present invention. The second camera monitors the reference object at regular intervals, which is typically a few seconds, in order to continuously make the auto-focusing corrections in real time. In the preferred embodiment, the second camera is a guider camera, and the reference object can either be a natural star or an artificial star created by emitting a laser in the Earth's upper atmosphere. The computing unit generates the auto-focusing corrections by analyzing the image of the reference object. The focuser receives and executes the auto-focusing corrections, which improve the focus quality of the image that is being currently being captured by the imager camera and the focus quality of the image that is going to be captured by the second camera. Thus, the focuser is shared by the imager camera and the second camera.

The image collecting device, the focuser, the imager camera, the second camera, and the optical aberration device are configured into an optical train. The image collecting device is in optical communication with the beam selector through the focuser so that the auto-focusing corrections can be made before the EM radiation captured by the image collection device is able to reach the beam selector. Moreover, the beam selector is in optical communication with the with the imager camera and is in optical communication with said second camera through the optical aberration device, which allows the beam selector to split and send the captured EM radiation to both the imager camera and the second camera. The optical aberration device is used to create optical asymmetries within the captured EM radiation, which allows the computing unit to analyze those optical asymmetries in order to determine the defocused direction of the focus quality. Thus, the second camera is communicably coupled to the computing unit so that the second camera can exchange image information with the computing unit. Once the auto-focusing corrections are determined by the computing unit, the computing unit will send the auto-focusing corrections to the focuser and, thus, is communicably coupled to the focuser.

The closed-loop system includes some optional features that could be used to improve the functionality of the present invention. One optional feature is that the imager camera is communicably coupled to the computing unit, which allows the computing unit to receive the image of the target and allow the computing unit to generate a different set of auto-focusing corrections from the image of target. Another optional feature is that the closed-loop system further comprises a base and an orientation mechanism. The base is used to stability mount the image collection device, and the orientation mechanism is used to adjust the orientation of the image collection device. The image collection device is rotatably and pivotally mounted to the base by the orientation mechanism, which allows the computing unit to generate and send another set of auto-focusing corrections with the orientation mechanism. Thus, the orientation mechanism needs to be communicably coupled to the computing unit.

The method of implementing the closed-loop system for auto-focusing in photography is used to provide auto-focusing corrections in real time so that the image of a target is properly captured during its exposure time. Typically, the target can be any celestial body or anything emitting EM radiation. A reference object is used to provide a comparison for the focus quality for the target. The target and an at least one reference object needs to be within the field of view (FOV) of the image collection device in order to start using the closed loop system. The method begins by receiving exposure data through the image collection device so that the image collection device is able to properly magnify the target. The exposure data is the visual information or the EM radiation for the target and the reference object. The method proceeds by separately sending the exposure data to both the imager camera and the second camera through the beam selector. This allows the imager camera to progressively record an image of the target and allows the imager camera to independently function from the second camera. The sensor plane of the imager camera needs to be coincidently positioned with the best focus plane of the image collection device in order to produce the best quality image of the target. The sensor plane of either the imager camera or the second camera is configured with a sensor chip.

For the other optical path through the closed-loop system, the optical aberration device is used encoding optical asymmetries into the exposure data with before the exposure data reaches the second camera, which embeds the defocused direction into the exposure data. The method of implementing the closed-loop system continues by recording and producing an image of the reference object on the sensor plane of the second camera. The optical asymmetries are transferred from the exposure data and are embedded into the image of the reference object, which is analyzed with the computing unit in order to assess the focus quality of the incoming exposure data and is analyzed with the computing unit in order to detect the defocused direction for the exposure data. Based on this analysis, the computing unit generates a set of auto-focusing corrections with the imager camera in order to improve the focus quality of the exposure data with respect to the defocused direction. The focuser executes the auto-focusing corrections in order to coincidently reposition the sensor plane of the imager camera with the plane of best of focus for the image collection device. These steps for the other optical through the closed-loop system are repeated at regular intervals until the image of the target is fully captured and produced by the imager camera.

In the preferred embodiment of the present invention, on-axis guiding device can be used as the beam selector. It is understood that an off-axis guiding device, a self-guided camera (having an imager camera and a guider chips in the same body), or a combination thereof could also be used as both the beam selector. This is provided that the optical aberration device can be placed the optical path towards the second camera.

More specifically, the optical aberration device is placed in the optical path of the second camera in order to retrieve information about the focus quality and information related to the "in" and "out" position relative to the plane of best focus. The latter function is critical since the auto-focusing corrections generated by the computing unit needs to know the defocused direction so that the focuser can moved in the opposite direction (back towards the plane of best focus).

Since the autofocus can correct while imaging the target with the imager camera, one could not use iterative "in" and "out" focus steps as does the state of the art. Doing so would ruin the current image and defeat the purpose of this invention. The key idea is to create some different reference star image(s) depending of the focus position (in or out) versus the best focus. Those images encode the information of focus quality (how close we are to best focus) as well as the direction of the defocus ("in" or "out").

The present invention allows for auto-focusing corrections while imaging the target with the imager camera, but the present invention could not use an iterative "in" and "out" set of focusing steps as done by previous methods. Using the iterative "in" and "out" set of focusing steps would ruin the image of the target and would defeat the purpose of the present invention. Therefore, the method of the present invention aims to create an image of the reference object with different image properties that depend on the defocused direction (whether "in" or "out") in relation to the best focus plane. The image of the reference object is thus encoded with the information about the focus quality (how close we are to best focus) as well as the defocused direction ("in" or "out"). In one embodiment of the present invention, astigmatism is the optical asymmetries produced by the optical aberration device. However, anybody skilled in the art of optics would understand that there are other ways to achieve similar function by means of a different optical device, such as, but not limited to, mirrors, lenses, and asymmetric or aspheric optics. Similar techniques are used for focusing laser beams in compact discs, digital video discs, or blue-ray disks.

Figure 1:
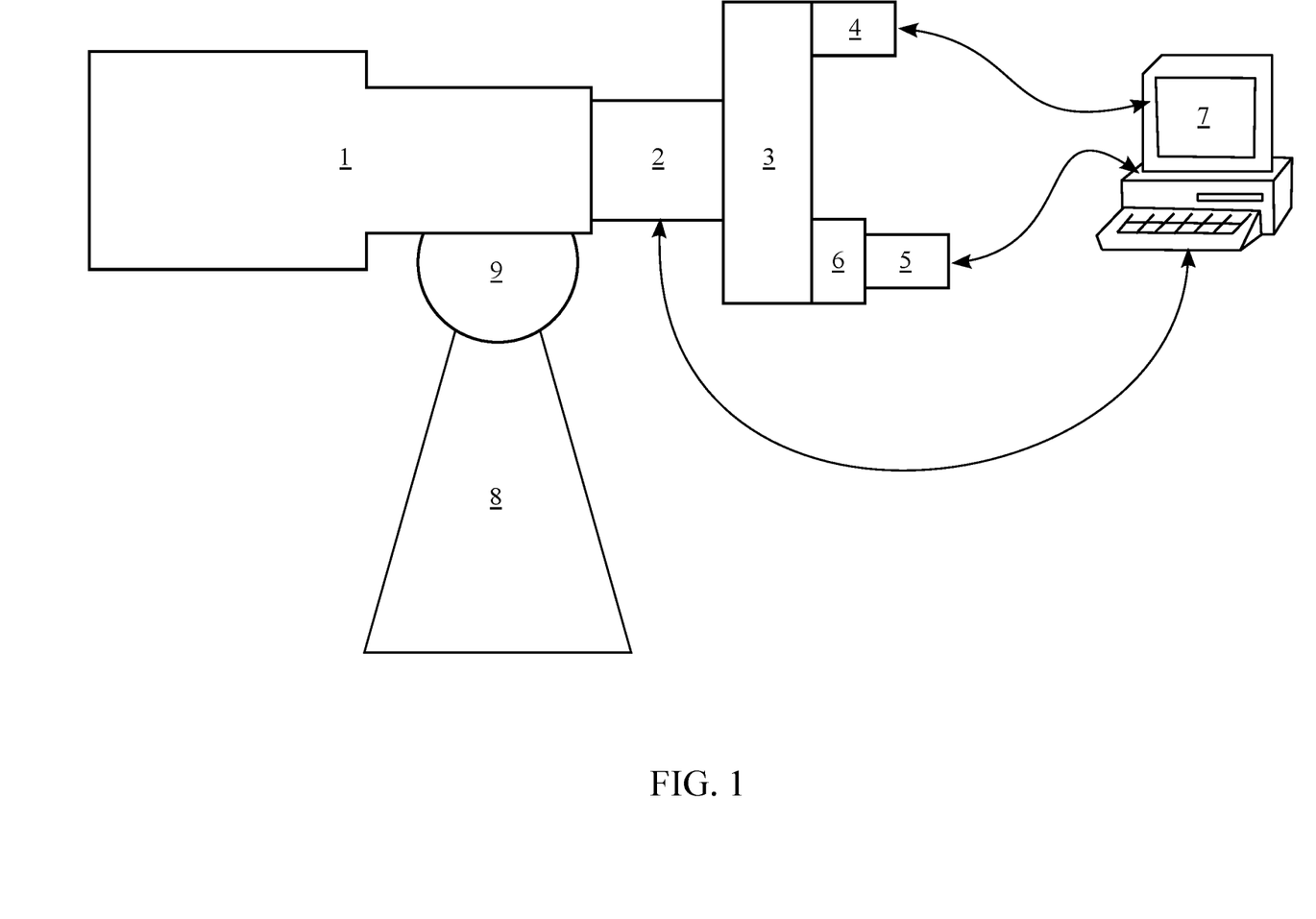
FIG. 1 shows an on-axis guide system coupled to a computing device and a main scope according to an embodiment of the present invention.
Figure 2A:
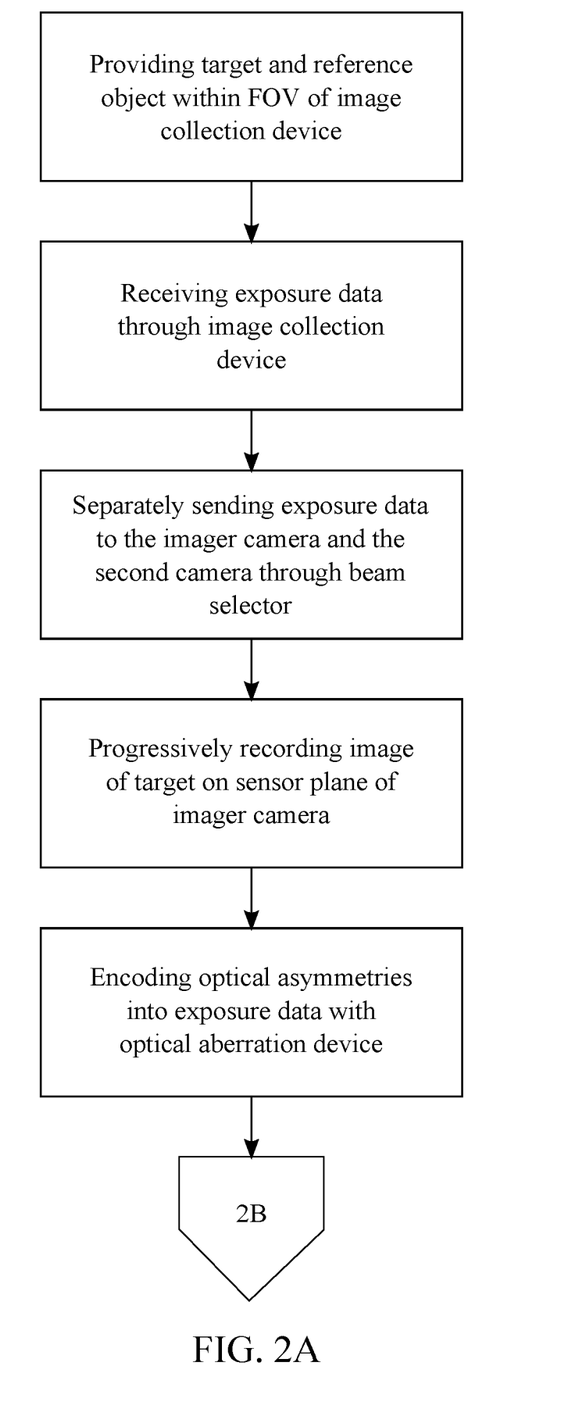
FIGS. 2A through 2B show exemplary flow charts of the present method.
Figure 2B:
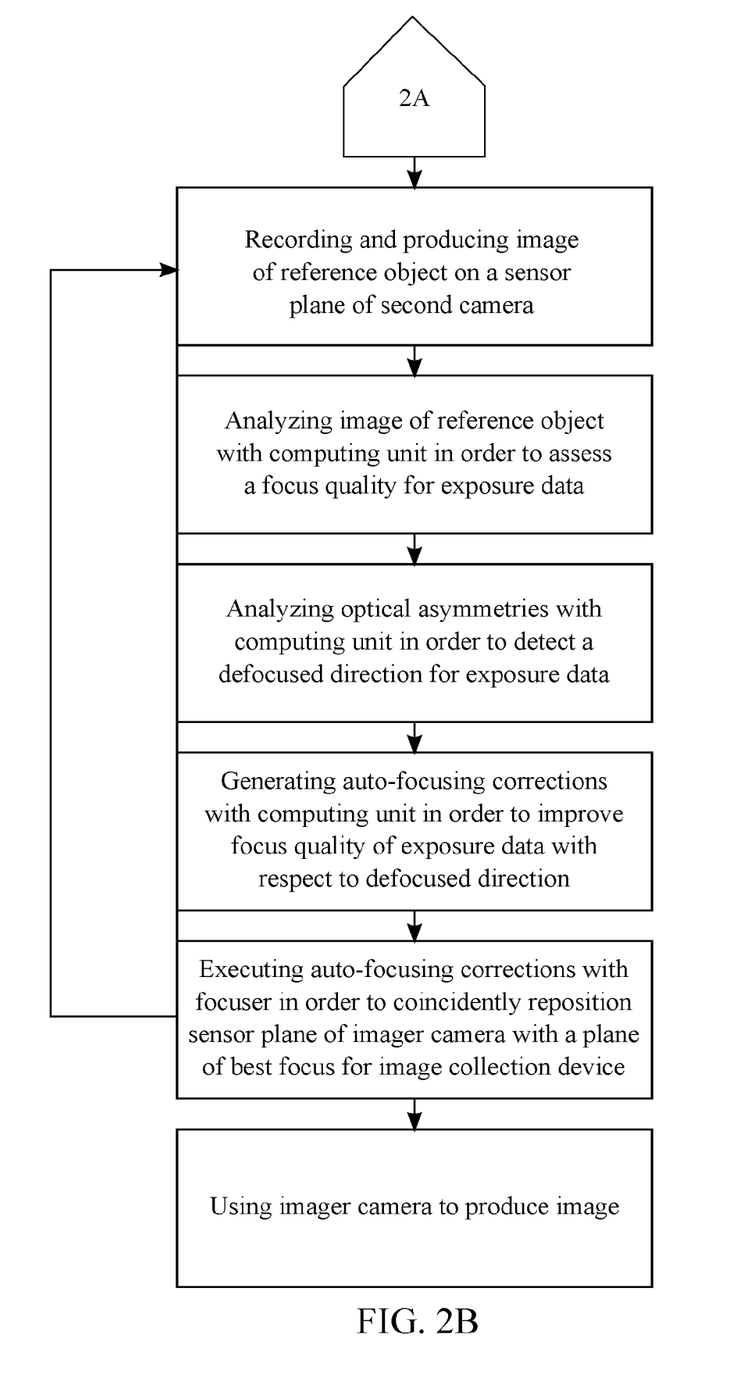
Figure 3:
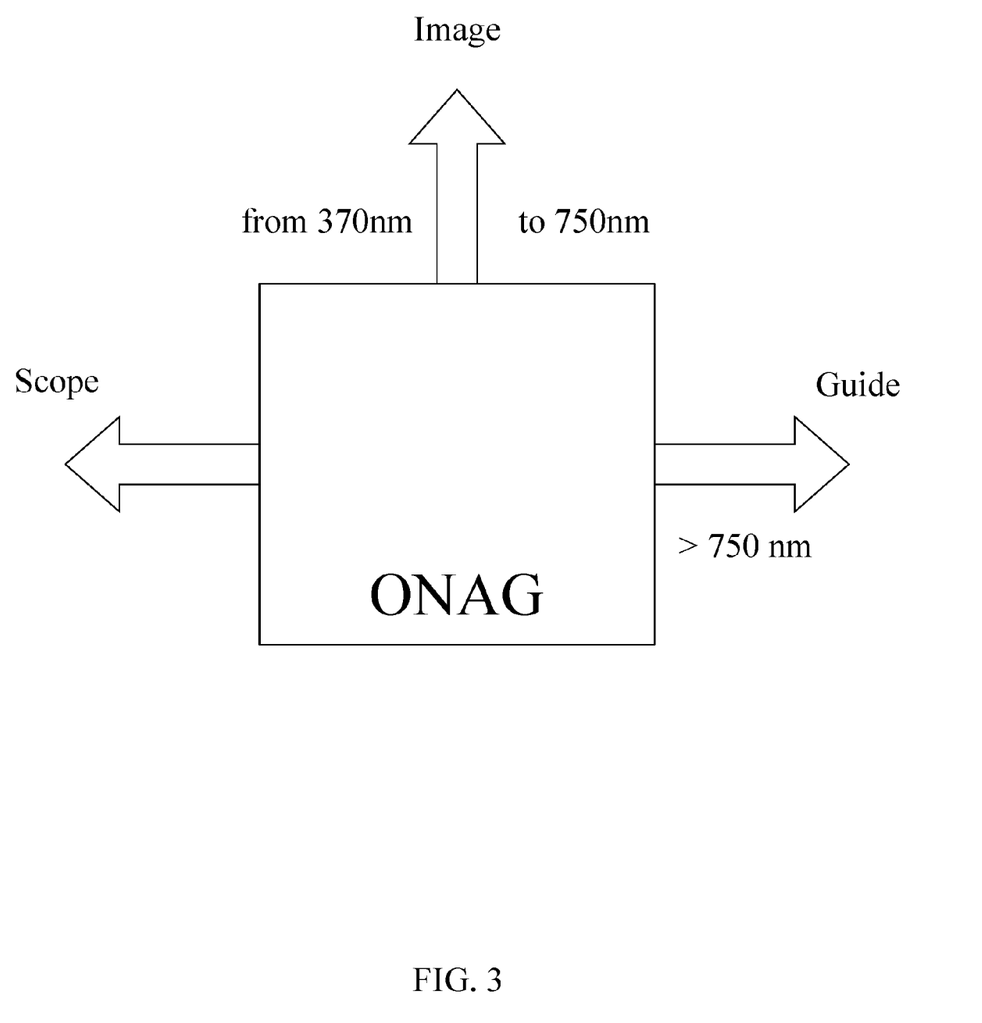
FIG. 3 shows an on-axis guide system according to an embodiment of the present invention.

For the preferred embodiment of the beam separator, the on-axis guiding device splits the incoming light from the image collection device into two different wavelength bands, wherein the visible band is typically used for imaging and the infrared band is typically used for guiding. This is done by using a dichroic mirror. FIG. 3 illustrates the principle behind the on-axis guiding device. It is understood that the wavelength bands could be different than the example shown in FIG. 3, including transmission of visible and reflection of the infrared, or any other useful combination depending of the application. Also in this example, the visible light (from 370 nm to 750 nm) is reflected toward the imager camera, while the near infrared (NIR) above 750 nm is transmitted toward the second camera. Moreover, FIG. 3 is an example of possible configuration. The imager camera and the second camera could be permutated depending of the application or on the type of dichroic mirror being used. Also, the imager camera and the second camera do not need to be at 0 and 90 degrees relative to the optical axis and/or each other, and various other configurations could be considered as well.

Figure 4:
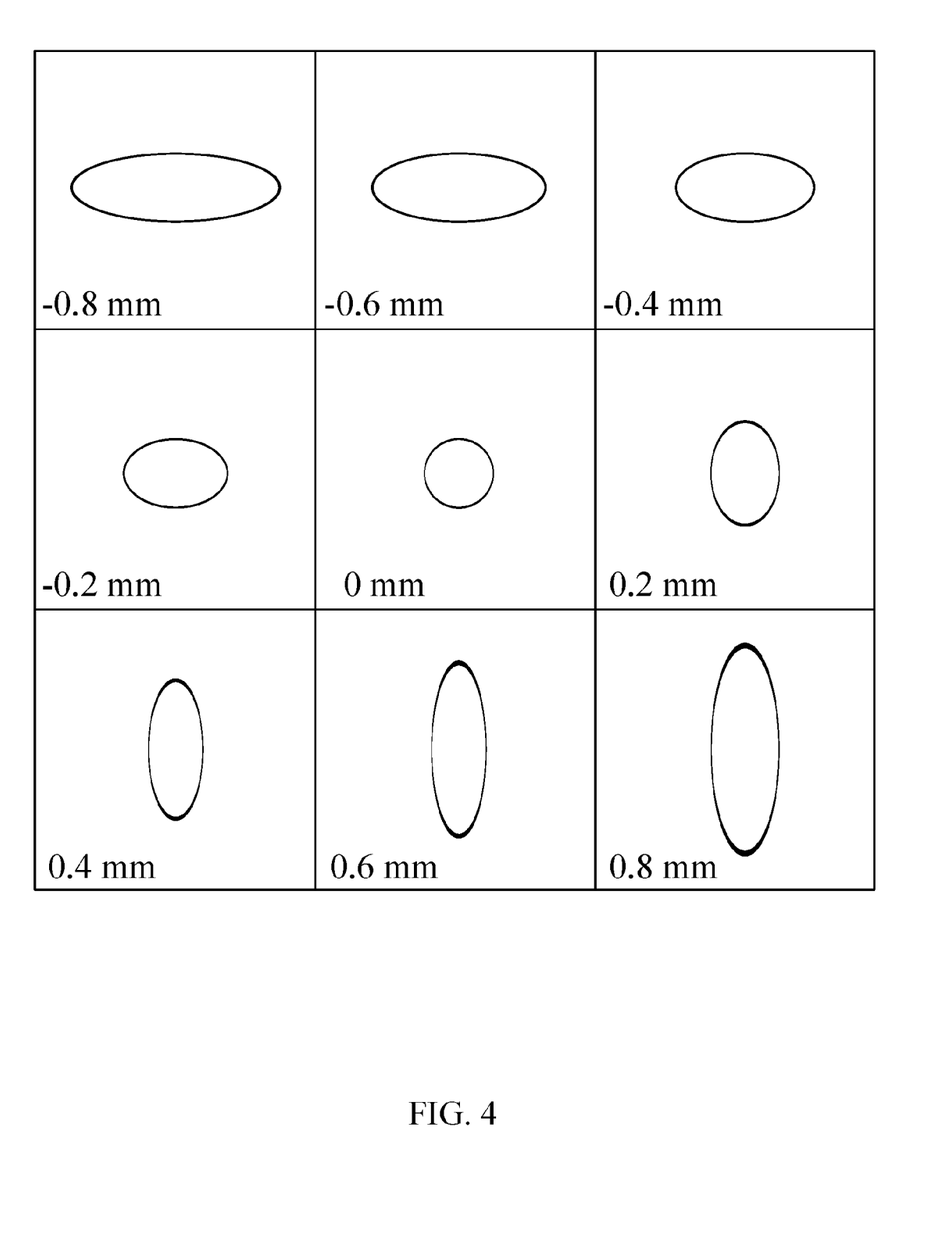
FIG. 4 shows the shape of a reference star at different focus quality.

The dichroic mirror is made of an optical glass that is typically mounted at or around 45 degrees relative to the optical axis. Although the reflected lights does not exhibit any optical aberrations from refraction, the transmitted light (NIR in this example) does and suffers from astigmatism due to the glass thickness of the dichroic mirror (a tilted parallel plate), which is typically few millimeters. The astigmatism is used to provide information about the focus quality and the defocused direction. After going through the dichroic mirror, the image of a point light source (such as a star) from a telescope will have an ellipsoid shape or a little asymmetric cross section depending of the optical design of the telescope. The image shape analysis for the reference object depends on the positions and the lengths of both the major axis and minor axis of the ellipsoid shape, which provides information about focus quality and the defocused direction as seen in FIG. 4. The images in FIG. 4 show the shape of a reference star at best focus (0.0 mm), "out" (after best focus) up to +0.8 nm, and "in" (before best focus) up to −0.8 mm. FIG. 4 illustrates that there is information available in terms of the focus quality and defocused direction. Anybody skilled in the art of image processing would understand that there are many
algorithms available to process such images. Among those algorithms, one algorithm computes the length of the X-axis (horizontal) and the length of the Y-axis (vertical).

In this example, the major axis and the minor axis are parallel to the sensor orientation axes of the imager camera and the second camera. However, the major axis and the minor axis could be rotated relative to the sensors' frame of reference. Therefore, a coordinate system transformation could be applied in such a case, which does not remove any value of the theory of operation of the present invention. In the example, the major axis and the minor axis are parallel to the sensor orientation axes in order to create a simpler explanation, but this is not meant to limit the present invention in any way.

The present invention uses the optical asymmetries to determine a figure of merit or an error term that can be used by the computing unit to generate the set of auto-focusing corrections that bring the sensor plane of the imager camera back to the plane of best focus. The computing unit could be more or less complex depending of the required precision, the telescope, and the performance and quality of the focuser. The simplest embodiment of the computing unit would be a proportional-integral controller, wherein the integration term I is provided by the focuser itself. Predictive controllers could be used for instance, and adaptive techniques could even improve the performances depending of the situation and results, such as a Kalman's filter.

Moreover, the beam selector provides two optical paths for the light coming from the image collection device through the focuser. One optical path goes towards the imager camera and its accessories if any (such as a filter wheel). The other optical path goes toward the second camera through an optical aberration device that creates a different image shape function of the focus position (like the astigmatism described above) in order to encode defocused direction information.

In addition, the second camera could be also the guider camera. The beam selector could be a body (such as passive adapter) with at least two connections to mount at least two cameras (the imager camera and the second camera), and, in this situation, the imager camera and the second camera would see a different FOV. Also in this situation, a self-guided camera with two chips could be used. The beam separator could be an off-axis guiding device or a beam splitter (such as the on-axis guiding device). In the latter case, the imager camera and the second camera may share the same FOV or exhibit a significant overlap between their respective FOV, but this is not required for the present invention.

The computing unit that controls the focuser could also be communicably coupled to the imager camera and even the orientation mechanism that supports the telescope. However, the computing unit could be used only for making the auto-focusing corrections, while another computer is able to manage the imager camera and other devices. In this example, the computing unit is in charge of collecting images from the second camera over time, processing those images to retrieve focus quality and the defocused direction ("in", or "out"), and prompting the focuser to accordingly move in order to keep the closed-loop system at best focus. If the computing unit also has access to the imager camera, then the computing unit can synchronize the auto-focus operation with the imaging (frame) collection, as well as auto-guiding when applicable. For instance, if the movement of the focuser induces too much shift of the FOV for the imager camera, then the computing unit could decide to move the focuser between the frames being taken by the imager camera only to avoid such shifts inside a given frame. Another possibility would be to correct the focus in only one preferred direction and to wait until the current frame is exposed in order to determine if there is any need to reverse the direction of the motion of focuser. This is because backlash could be a concern and could create significant image shift in a given frame. However, the normal course of operation would be to correct over time (for instance at regular interval, like every few seconds), the focuser using the images of the second camera while exposing the current frame of the imager camera. It is expected that the auto-focusing corrections, if any, would be very small at a few second sampling rate (likely minimum even at minute scales), therefore however possible image shift will be minimum, if any. If the second camera is also the guider camera and the computing unit can control the orientation mechanism for auto-guiding purpose (or an adaptive optics unit, or both), then synchronized auto-focus and auto-guiding tasks will correct for any possible image shift inside a given frame exposure as well. It is understood that many different variations and more complex algorithms can be implemented by the computing unit implemented to deal with backlash, system delays, inertia, user preferences, and other astrophotography tasks. It is also understood that calibration procedures and error handling management must be implemented by the computing unit as well.

Figure 5:
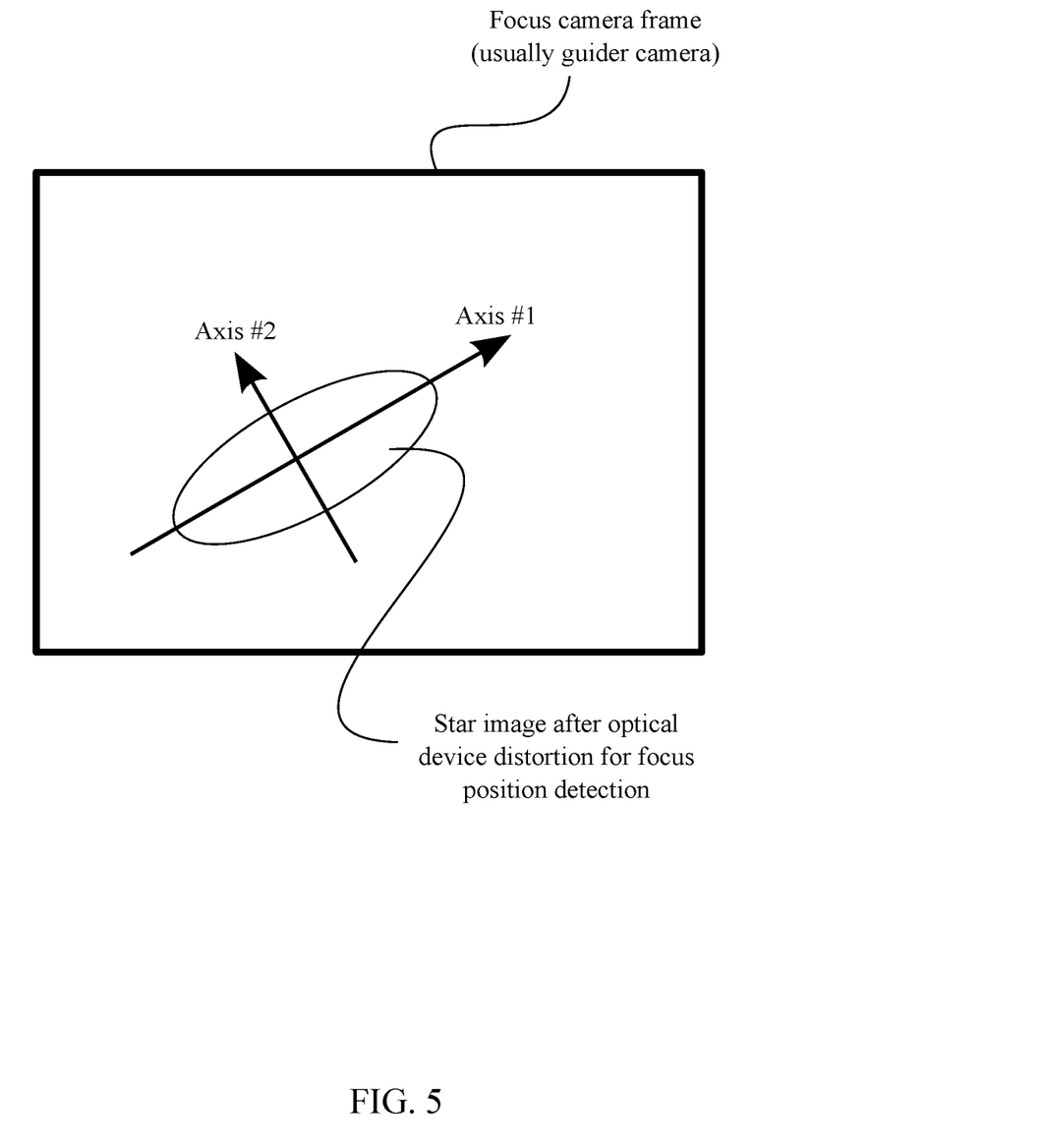
FIG. 5 shows a star image after optical device distortion for focus position detection.

The following is one of the possible approaches to implement the auto-focus algorithm. Using an optical aberration device that produces an astigmatism (described above) in order to determine a defocused direction in front of the focus camera and assuming the image of the reference object is approximately an ellipsoid-like shape, the present invention can compute an error term E (or a measurement of star roundness) using the two ellipsoid principal axes (minor and major axes are orthogonal to each other by definition). This can be seen in FIG. 5.

$$E=(Axis\#1\_length-Axis\#2\_length)/(Axis\#1\_length+Axis\#2\_length)$$

It is understood that other criteria or figures of merit could be computed for retrieving focus quality and defocused direction, such as but limited to Axis#1_length–Axis#2_length.

E=0 when at best focus (or near, see comments below)

Since we have two cameras involved in the operation, it is possible that the best focus of the imager camera does not correspond exactly to the best focus of the second camera (E=0). However, it is understood that we can just memorize, during calibration for instance, the related E value (close to zero) leading to the best focus of the imager camera and subtract it in the subsequence calculations.

The goal of the control algorithm would be then to hold this initial E value instead of E=0. For simplicity, in this document, we will assume that the best focus of the imager camera is achieved when E=0 indeed, this does not limit however the scope of the explanation and principle of this invention in any way.

E>0 when "out" of the best focus position (focus plane behind the sensor imager camera plane).

E<0 when "in" of the best focus position (focus plane in front of the sensor plane of the imager camera).

Depending of the optical train it is possible that the above definition is reversed. An initial calibration procedure will take care of this (direction and sign of E versus focus). The focuser can be seen as an integrator and it Z transform is given by:

$$G(Z)=G0/(1-Z^-1) \qquad (1)$$

G0 is the focuser versus E signal gain (with its sign). It defines how much the motion of the focuser (in a given direction) changes the signal E. In order to minimize seeing effect and noise, the error signal E should be filtered to insure a smooth estimation of the focus. A simple low pass digital filter can be used for such task.

$$F(Z)=(1-a)/(1-a*Z^-1) \qquad (2)$$

Where 1>a>0, the larger the value of "a" is, the stronger the filter effect. In the time domain, assuming x is the input samples, and y the output filter samples, for a given index k, the filter can be written as:

$$y[k]=a*y[k-1]+(1-a)*x[k] \qquad (3)$$

The filter impacts the stability of the controlled loop and must be taken in consideration to define the optimal proportional gain (Kopt) of the PI controller. Here we assume that the focuser timing is negligible in regard of the sampling rate dt, which is the interval between two corrections and two images from the second camera (usually the guider camera), few second for instance.

The closed-loop system transfer function becomes:

$$H(Z)=G0(1-a)/((1-Z^-1)*(1-a*Z^-1)+G0*(1-a)*K) \qquad (4)$$

The optimal control gain Kopt is defined as the value of K for which the system is critically damped (no oscillation, fastest system).

After some simple calculations it can be shown that (an optimally 2nd order damped system assumes a real positive double pole on H (Z) denominator):

$$Kopt=(1-a)/(4*a*G0) \qquad (5)$$

Any gain K<Kopt will insure a stable system without any overshoot or oscillation. The gain G0 (including its sign) is retrieved during a calibration procedure, or provided by the user.

Equation (4) shows that Kopt is a function of the low pass filter coefficient "a" and the focuser versus E signal gain G0. Large value of "a" leads to a small Kopt and to small corrections. Smaller values allow for faster corrections (larger Kopt).

The present invention claims, among things, the use of a real time autofocus process to keep the images of a given target at best focus all the time while imaging the target with an imager camera (sensor) and monitoring at least one reference star (or relevant object) with at least one second camera (sensor), using the same telescope, for providing focus quality and correction direction information to the autofocus controller.

This is a closed loop system including at least two cameras (sensors), an optical device to encode focus quality and focus direction information, a focuser mechanism, and a controller to close the autofocus loop.

Although the invention has been explained in relation to its preferred embodiment, it is to be understood that many other possible modifications and variations can be made without departing from the spirit and scope of the invention as hereinafter claimed.

What is claimed is:

1. A closed-loop system for auto-focusing in photography comprising:
an image collecting device;
a focuser;
a beam selector;
an imaging camera;
a second camera;
an optical aberration device;
a computing unit, wherein said computing unit is configured to:
analyze an image of a reference object to assess a focus quality for an exposure data;
analyze optical asymmetries to detect a defocused direction for said exposure data;
generate auto-focusing corrections to improve said focus quality of said exposure data with respect to said defocused direction;
said imaging collecting device being in optical communication with said beam selector through said focuser;
said beam selector being in optical communication with said second camera through said optical aberration device;
said second camera being communicably coupled to said computing unit; and
said computing unit being communicably coupled to said focuser.

2. The closed-loop system for auto-focusing in photography of claim 1, wherein said imaging collecting device is a telescope.

3. The closed-loop system for auto-focusing in photography of claim 2, wherein said second camera is a guider camera.

4. The closed-loop system for auto-focusing in photography of claim 1, wherein said imaging camera is communicably coupled to said computing unit.

5. The closed-loop system for auto-focusing in photography of claim 1, further comprising:
a base;
an orientation mechanism;
said image collection device being rotatably and pivotally mounted to said base by said orientation mechanism; and
said orientation mechanism being communicably coupled to said computing unit.

6. A method of implementing a closed-loop system having an image collecting device, a focuser, a beam selector, an imaging camera, a second camera, an optical aberration device, and a computing unit, the method comprising the steps of:
(A) providing a target and at least one reference object within a field of view for said image collection device;
(B) receiving exposure data through said image collection device, wherein said exposure data includes visual information of said target and said at least one reference object;
(C) separately sending said exposure data to both said imaging camera and said second camera through said beam selector;
(D) progressively recording an image of said target on a sensor plane of said imaging camera;
(E) encoding optical asymmetries into said exposure data with said optical aberration device before said exposure data reaches said second camera;
(F) recording and producing an image of said reference object on a sensor plane of said second camera, wherein said optical asymmetries are embedded into said image of said reference object;
(G) analyzing said image of said reference object with said computing unit in order to assess a focus quality for said exposure data;
(H) analyzing said optical asymmetries with said computing unit in order to detect a defocused direction for said exposure data;
(I) generating auto-focusing corrections with said computing unit in order to improve said focus quality of said exposure data with respect to said defocused direction;
(J) executing said auto-focusing corrections with said focuser in order to coincidently reposition said sensor plane of said imaging camera with a plane of best focus for said image collection device;
(K) repeating said steps (F) through (J) until said image of said target is produced by said imaging camera; and
(L) producing said image of said target with said imaging camera.

7. The method of claim 6, further comprising the steps of:
embedding an astigmatism into said exposure data with said optical aberration device, wherein said astigmatism is said optical asymmetries;
producing an ellipsoid image of said reference object, wherein said ellipsoid image is defined by a major axis and a minor axis, and wherein said major axis and said minor axis are parallel to said sensor plane of both said imaging camera and said second camera;
calculating a proportionate error term with reference to said major axis and said minor axis;
equating magnitude of said proportionate error term to said focus quality; and
equating numerical sign of said proportionate error term to said defocused direction.

8. The method of claim 7, the method further comprising the steps of:
measuring a length for said major axis and a length for said minor axis;
calculating a difference between said length for said major axis and said length for minor axis;
calculating a sum for said length of said major axis and said length for minor axis; and
dividing said difference by said sum in order to calculate said proportionate error term.

9. The method of claim 7, wherein:
said beam selector is a dichroic mirror;
said optical aberration device is a glass thickness of said dichroic mirror;
a reflected portion of said exposure data is directed towards said imaging camera by said dichroic mirror; and
a transmitted portion of said exposure data is directed towards said second camera by said dichroic mirror.

10. The method of claim 7, wherein:
said beam selector is a beam splitter;
said optical aberration device is a glass thickness of said beam splitter;
a higher intensity portion of said exposure data is directed towards said imaging camera; and
a lower intensity portion of said current exposure mirror is directed towards said second camera.

11. The method of claim 6, the method further comprising the steps of:

synchronizing said computing unit with said imaging camera;

preventing a specific iteration of said step (J);

if said specific iteration of said step (J) causes a noticeable shift in said field of view, executing said specific iteration of step (J) after completing said image of target with said imaging camera.

12. The method of claim 6, the method further comprising the steps of:

synchronizing said computing unit with said imaging camera;

designating a preferred direction of movement for said focuser;

restricting said focuser to move only in said preferred direction during each iteration of said step (J); and analyzing an overall focus quality for said image of said target in order to access whether or not to allow said focuser to move in another direction during said step (J), wherein said other direction is opposite of said preferred direction.

13. The method of claim 6, wherein said computing unit is a proportional-integral controller.

14. The method of claim 6, wherein said image of said reference object is analyzed through a low pass digital filter with said computing unit.

\* \* \* \* \*